United States Patent
Kaliaperumal et al.

(10) Patent No.: US 12,448,694 B2
(45) Date of Patent: Oct. 21, 2025

(54) HIGHLY ACTIVE AND DURABLE NON-NOBLE METAL-SULPHIDE BASED HER CATALYST AND THE PREPARATION THEREOF

(71) Applicant: COUNCIL OF SCIENTIFIC AND INDUSTRIAL RESEARCH, New Delhi (IN)

(72) Inventors: Selvaraj Kaliaperumal, Pune (IN); Manoj Shanmugasundaram, Pune (IN)

(73) Assignee: Council of Scientific and Industrial Research, New Delhi (IN)

( * ) Notice: Subject to any disclaimer, the term of this patent is extended or adjusted under 35 U.S.C. 154(b) by 647 days.

(21) Appl. No.: 17/758,955

(22) PCT Filed: Jan. 14, 2021

(86) PCT No.: PCT/IN2021/050035
§ 371 (c)(1),
(2) Date: Jul. 15, 2022

(87) PCT Pub. No.: WO2021/144810
PCT Pub. Date: Jul. 22, 2021

(65) Prior Publication Data
US 2023/0061774 A1    Mar. 2, 2023

(30) Foreign Application Priority Data
Jan. 15, 2020    (IN) .............................. 202011001811

(51) Int. Cl.
C25B 11/091    (2021.01)
C25B 1/04    (2021.01)
H01M 4/92    (2006.01)

(52) U.S. Cl.
CPC .............. C25B 11/091 (2021.01); C25B 1/04 (2013.01); H01M 4/923 (2013.01)

(58) Field of Classification Search
CPC ... B01J 27/051; B01J 27/0515; C25B 11/091; C25B 1/04; H01M 4/923
USPC ................................................. 502/220–222
See application file for complete search history.

(56) References Cited

U.S. PATENT DOCUMENTS

| | | | |
|---|---|---|---|
| 4,409,131 A | 10/1983 | Fetchin | |
| 2022/0190243 A1* | 6/2022 | Bagheri | B01J 20/28035 |
| 2024/0133061 A1* | 4/2024 | Kou | B01J 35/40 |

FOREIGN PATENT DOCUMENTS

| | | | | |
|---|---|---|---|---|
| CN | 109235024 A | * | 1/2019 | ............. B82Y 30/00 |
| CN | 110510679 A | * | 11/2019 | ............. B82Y 40/00 |
| CN | 111111705 A | * | 5/2020 | ............. B01J 27/049 |
| CN | 114318407 A | * | 4/2022 | ............... C25B 1/04 |

OTHER PUBLICATIONS

Yaquing Yang et al., "MoS2-Ni3S2 Heteronanorods as Efficient and Stable Bifunctional Electrocatalysts for Overall Water Splitting." ACS Catalysis 7, pp. 2357-2366. (Year: 2017).*
Xiaobing Xu et al., "Highly efficient hydrogen evolution based on Ni3S4@MoS2 hybrids supported on N-doped reduced graphene oxide." Applied Surface Science 428, pp. 1046-1055. (Year: 2018).*
Xuguang Sun et al., "The synthesis and nonlinear optical properties of NiS2/MoS2 composites." Optical Materials 98, pp. 1-7. (Year: 2019).*
Yuxi Ren et al., "Hierarchical Ni3S4@MoS2 nanocomposites as efficient electrocatalysts for hydrogen evolution reaction." Journal of Materials Science and Technology 95, pp. 70-77. (Year: 2021).*
Shengchun Qin et al., "MoS2/Ni3S4 composite nanosheets on interconnected carbon shells as an excellent supercapacitor electrode architecture for long term cycling at high current densities." Applied Surface Science 440, pp. 741-747. (Year: 2018).*
Shaohui Guo et al., "Enhanced hydrogen evolution via interlaced Ni3S2/MoS2 heterojunction photocatalysts with efficient interfacial contact and broadband absorption." Journal of Alloys and Compounds 749, pp. 473-480. (Year: 2018).*
First Examination Report in corresponding Indian Application No. 202011001811, dated May 10, 2023.
Cui et al., "Ni$_x$S$_y$MoS$_2$ hybrid microspheres: One-pot hydrothermal synthesis and their application as a novel hydrogen evolution reaction electrocatalyst with enhanced activity" (2014). Electrochimica Acta, 137, 504-510, 2014.
Toh et al., "3R phase of MoS$_2$ and WS$_2$ outperforms the corresponding 2H phase for hydrogen evolution" (2017), Chemical Communications, 53(21), 3054-3057.
International Search Report in International Application No. PCT/IN2021/050035, dated Apr. 15, 2021.
An, T. et al. 2013 "Interlaced NiS$_2$—MoS$_2$ Nanoflake-Nanowires as Efficient Hydrogen Evolution Electrocatalyst in Basic Solutions" J. Mater. Chem. A, 2016,4, 13439-13443.
Gu, X. et al. 2020 "Hybrid Ni$_3$S$_2$—MoS$_2$ nanowire arrays as a pH-universal catalyst for accelerating the hydrogen evolution reaction" Chem Commun 56: 2471-2474.
Cao, J. et al. "Dominating Role of Aligned MoS2/Ni3S2 Nanoarrays Supported on 3D Ni Foam with Hydrophilic Interface for Highly Enhanced Hydrogen Evolution Reaction" ACS Appl. Mater. Interfaces 2018, 10, 2, 1752-1760.

* cited by examiner

*Primary Examiner* — Patricia L. Hailey
(74) *Attorney, Agent, or Firm* — Knobbe Martens Olson & Bear LLP

(57) ABSTRACT

A highly active and exceptionally durable non-noble metal-sulphide based Hydrogen Evolution Reaction (HER) catalyst and the preparation thereof. More particularly, provided is a highly active earth abundant metal-sulphide based HER catalyst with exceptionally durable hydrogen evolution activity even after 100 hrs.

6 Claims, 4 Drawing Sheets

(a)

(b)

(a)

(b)

HIGHLY ACTIVE AND DURABLE NON-NOBLE METAL-SULPHIDE BASED HER CATALYST AND THE PREPARATION THEREOF

FIELD OF THE INVENTION

The present invention relates to a highly active and exceptionally durable non-noble metal-sulphide based Hydrogen Evolution Reaction (HER) catalyst and the preparation thereof. More particularly, the present invention provides a highly active earth abundant metal-sulphide based HER catalyst with exceptionally durable hydrogen evolution activity even after 100 hrs and scalable facile preparation thereof.

BACKGROUND OF THE INVENTION

Nowadays energy consumption has increased tremendously along with lot of environmental pollution. Day by day, it is becoming difficult to withstand this demand for energy and pollution issues. It is now thus becoming the urgent need of the society to focus on the development of sustainable and eco-friendly energy source to replace carbon containing fossil fuels. The best green replacement to these fossil fuels is found in the form of Hydrogen due to its high energy density and zero carbon emission. As on today majority of the hydrogen produced at large scale is via steam reforming of hydrocarbons that again contributes heavily into $CO_2$ emission. A most promising cleaner way for hydrogen is water splitting.

Several methods are known in the art to produce the molecular hydrogen as an energy source from the water such as thermochemical, electrolytic, direct solar water splitting, and biological process. Among all these, the electrochemical water splitting is the easiest and scalable to produce the molecular hydrogen from water. Pt and $RuO_2/IrO_2$ catalysts are benchmark electrocatalysts for HER and (Oxygen Evolution Reaction) OER, respectively. However, because of their scarcity and poor stability, they limit the level of commercial exploitations. Therefore, it is needed to develop the non-noble metal based electrocatalysts that performs water electrolysis in both acidic as well as alkaline medium.

In general, there are three major hitches in realizing an ideal and yet commercially exploitable water splitting catalytic systems viz., (i) substrate independent high performance (ii) avoidance of non-ambient synthesis steps hostile to scalability such as high temperature treatment and (iii) non-corrosive medium.

To understand these points further, for instance, HER is though favorable in acidic medium, this option suffers with drawbacks such as poor stability of the catalysts, corrosion of the catalysts, associated acid fog etc., which make it unreliable and unsafe for industrial use. However, the challenge in alkaline media is that the catalyst should overcome the natural limitation of poor availability of H+ ions in the medium that demands higher energy to dissociate the water molecule. In this way, globally the research focus is on developing the highly active and durable electrocatalyst in alkaline medium.

Transition metal-based catalysts are recently emerging as efficient catalysts for water splitting in alkaline media. Among them, Mo based catalysts such as, $MoO_x$ $Mo_2C$ and $MoS_2$ are well known electrocatalysts for water splitting. Various polymorphs of $MoS_2$ such as $2H_2$, 3R and 1T $MoS_2$ are known in the art. 2H $MoS_2$ may be considered as bulk $MoS_2$ where its sheets are stacked together leading to inactive basal planes and active edges. It is though stable in acidic medium, is poorly active and unstable in alkaline medium due to sluggish water dissociation and slow H adsorption-desorption kinetics. 1T-$MoS_2$ materials, on the other hands, are highly active for $H_2$ production as both edge and basal planes are equally active. However, it is thermodynamically metastable. 1T-$MoS_2$ is generally synthesized using alkali-metal intercalation and exfoliation. Finally, the third polymorph, ie., 3R-$MoS_2$ is few layered structures of $MoS_2$ and similar to 2H-$MoS_2$ by properties. Although, 3R-$MoS_2$ has huge scope to be explored for improved catalytic activity and stability, it is yet to be understood well for overall water splitting in alkaline media.

The article entitled "Dominating Role of Aligned MoS2/Ni3S2 Nanoarrays Supported on Three-Dimensional Ni Foam with Hydrophilic Interface for Highly Enhanced Hydrogen Evolution Reaction" by Jiamu et al. and published in the journal "Mater. Interfaces, 2018, 10, 1752-1760" reports $MoS_2/Ni_3S_2$/Ni nanoarray synthesized through hydrothermal process. But the catalyst needs an overpotential of 76 mV to provide a current density of 10 mA $cm^{-2}$.

Its remarkable activity is reasoned out to be due to the availability of large surface area and abundant active sites in the atypical heterostructure formed by the $MoS_2$ nanosheets on the surface of $Ni_3S_2$ nanoarray. Another article entitled "Interlaced $NiS_2$—$MoS_2$ nanoflake-nanowires as efficient hydrogen evolution electrocatalysts in basic solutions" published in the journal "Mater. Chem. A, 2016, 4, 13439" by An et al. reports to have achieved a highly stable $MoS_2$ via its Chemical Vapour Deposition (CVD) over hydrothermally preformed $NiS_2$ stating the relatively higher stability of the later.

Similarly, it may be noted here that these highly active catalysts are substrate dependent. They use a support such as Nickel Foam (NF), carbon paper, Ti foil and carbon cloth during their syntheses and follow high temperature treatments under inert gas atmosphere to stabilize them. Contrastingly, literature shows that the water splitting activity of substrate-independent catalysts are relatively poor both in alkaline and acidic media.

Therefore, the three major hitches as mentioned earlier are the concerning areas of researchers in developing electrocatalysts for overall water splitting. In brief, the current invention in the similar emphasis gains major attention.

OBJECTS OF THE INVENTION

Main objective of the present invention is to provide a highly active non-noble metal-sulphide based catalyst for HER as a non-noble metal-based replacement to Pt, the benchmark HER catalyst.

Another objective of the present invention is to provide a process for the preparation of a highly active non-noble metal-based catalyst for HER.

Yet another objective of the present invention is to provide a highly active and stable metal-based catalyst for HER with exceptionally durable hydrogen evolution activity even after 100 hrs.

SUMMARY OF THE INVENTION

Accordingly, to fulfill the objective, the present invention provides a highly active non-noble metal-sulphide based catalyst for HER. The catalyst is based on unique combination of earth abundant metal-sulphides system, which is exceptionally stable and durable with negligible loss of activity even after 100 hrs.

In an embodiment the present invention provides an extremely active electrocatalyst for producing the Hydrogen ($H_2$) through water alkali electrolyser; wherein said catalyst is composed of 3R-$MoS_2$ with different polymorphs of $Ni_xS_y$ (wherein x=1,3,7,17 and y=1,2,4,8,17) for HER and OER in alkaline media. The efficient electrocatalysts require lesser over potential to reach the current density of 100 mA $cm^{-2}$ (moo) is ~85 mV for HER and the same (limo) is +450 mV for OER.

Another embodiment of the present invention provides a process for the preparation of a highly active earth abundant metal-sulphides based catalyst for HER; wherein said process comprises of dissolving $(NH_4)_6 Mo_7O_{24}.4H_2O$ (Ammonium molybdate tetrahydrate), Ni $(NO_3)_2.6H_2O$(Nickel nitrate hexahydrate) and $(NH_4)_2CS$ (Thio urea) in water and maintaining the reaction mixture at a temperature in the range of 150-250° C. for the period of 8-16 hr in an autoclave reactor to afford black coloured product of 3R-$MoS_4$-$Ni_xS_y$ catalyst; wherein x=1,3 and y=1,2,4.

Yet another embodiment of the present invention provides a highly active metal-sulphide based catalyst for HER; wherein said catalyst shows a notable stability in alkaline media with a negligible loss of the activity even after 100 hrs. Thus, the heterostructure of 3R-$MoS_2$-$Ni_xS_y$ catalyst becomes highly stable and durable for producing the large-scale hydrogen in water alkali electrolysers for industrial application.

ACRONYMS USED TO DESCRIBE THE INVENTION

HER: Hydrogen Evolution Reaction
OER: Oxygen Evolution Reaction
NS: Nickel sulphide
NF: Nickel Foam
MNS: Molybdenum Nickel Sulphide (3R-$MoS_2$-$Ni_xS_y$; wherein x=1,3 and y=1,2,4
LSV: Linear Sweep Voltammetry
PVDF: Polyvinylidene Fluoride
NMP: N-methyl pyrrolidone
RHE: Reversible Hydrogen Electrode
PXRD: Powder X-Ray Diffractometer
JCPDS: Joint Committee on Powder Diffraction Standards. $J_0$: Exchange current density (mA $cm^{-2}$)
$\eta_x$: Overpotential for an 'x'-value of current density

DETAILED DESCRIPTION OF THE INVENTION

Figure 1:
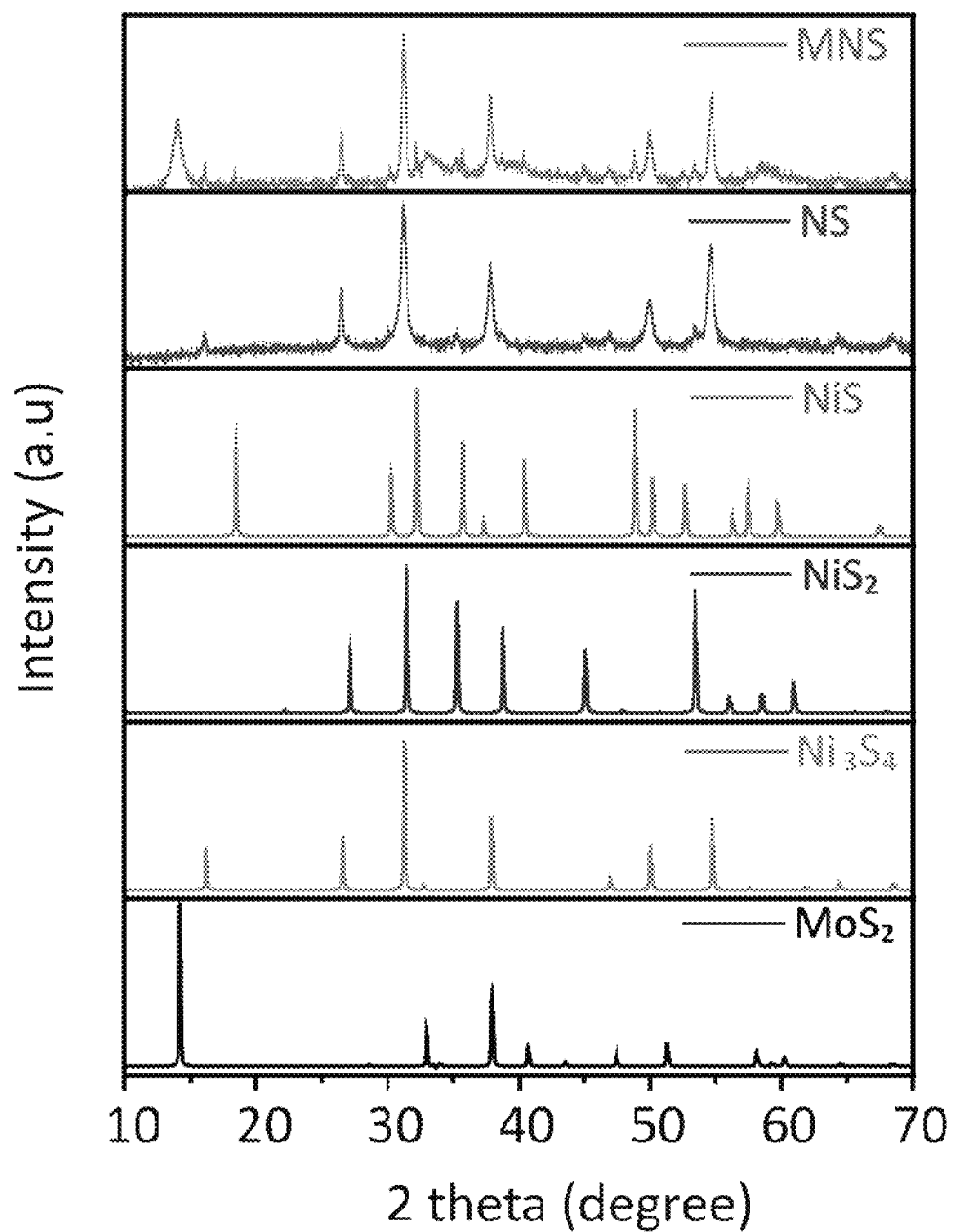
FIG. 1 depicts XRD pattern in carried out in PANanalytical X'pert pro dual goniometer diffractometer instrument equipped with Cu Kα radiation with wavelength 1.54 Å with applied voltage of 40 kV and beam current 30 mA.

The invention will now be described in detail in connection with certain preferred and optional embodiments, so that various aspects thereof may be more fully understood and appreciated.

The present invention provides a highly active metal-sulphide based catalyst for HER. The catalyst is based on unique combination of earth abundant metal-sulphides system, which is exceptionally stable and durable with negligible loss of activity even after 100 hrs.

In an embodiment the present invention provides an extremely active electrocatalysts for producing the Hydrogen ($H_2$) through water alkali electrolyser; wherein said catalyst is composed of 3R-$MoS_2$ with different polymorphs of $Ni_xS_y$ (wherein x=1,3 and y=1,2,4 for HER and OER in alkaline media. The efficient electrocatalysts require very less over potential to reach the current density of 100 mA $cm^{-2}$ ($\eta_{100}$) 85 mV for HER and ($\eta_{100}$)+450 mV for OER.

Mo exists as 1T, 2H and 3R polymorphs. 2H $MoS_2$ is bulk layered, similar to graphene, and has low activity. 1T $MoS_2$ is converted to 2H $MoS_2$ at high temperature 3R has few layers, a large surface area and is difficult to synthesize. However, 3R is more stable in comparison to other two polymorphs and is therefore difficult to form. The 3R polymorph of $MoS_2$ is in conjunction with NiS, $NiS_2$ and $Ni_3S_4$.

Another embodiment of the present invention provides a process for the preparation of a highly active earth abundant metal-sulphides based catalyst for HER; wherein said process comprises of dissolving $(NH_4)_6 Mo_7O_{24}.4H_2O$ (Ammonium molybdate tetrahydrate), Ni $(NO_3)_2.6H_2O$ (Nickel nitrate hexahydrate) and $(NH_4)_2CS$ (Thio urea) in water and maintaining the reaction mixture at a temperature in the range of 150-250° C. for the period of 8-16 hrs in an autoclave reactor to afford black coloured product of 3R-$MoS_4$-$Ni_xS_y$ catalyst; wherein x=1,3 and y=1,2,4.

Yet another embodiment of the present invention provides a highly active metal-sulphide based catalyst for HER; wherein said catalyst shows a notable stability in alkaline media with a negligible loss of the activity even after 100 hrs. Thus, the heterostructure of 3R-$MoS_2$-$Ni_xS_y$ catalyst becomes very stable and durable for producing the large-scale hydrogen in water alkali electrolysers for industrial application.

The electrochemical HER performance of the MNS catalyst is carried out in 1M KOH at the scan rate of 2 $mVs^{-1}$. The MNS catalyst (3R-$MoS_2$-$Ni_3S_4$-$NiS_2$-NiS) needs overpotentials of as low as 21 and 85 mV to reach the current densities of 20 and 100 mA $cm^{-2}$ respectively. This is three times lower than that of NS ($Ni_3S_4$-$NiS_2$) catalyst. The Tafel plots are used to understand the kinetics of the catalysts. The Tafel slope of MNS i.e. 82 mV $dec^{-1}$ is much lower than that of NS i.e., 112 mV $dec^{-1}$. The MNS catalysts are following the Volmer-Heyrovsky mechanism, i.e., electrochemical desorption reaction. MNS catalyst demonstrates an exchange current density of 2.04 mA cm-2 at OV vs RHE which is better than that of Pt/C, the benchmark catalyst. Higher the exchange current density, better is the intrinsic activity of the catalysts. The comparison of HER data for the MNS catalysts with standard is summarized below in Table-1.

Figure 3:
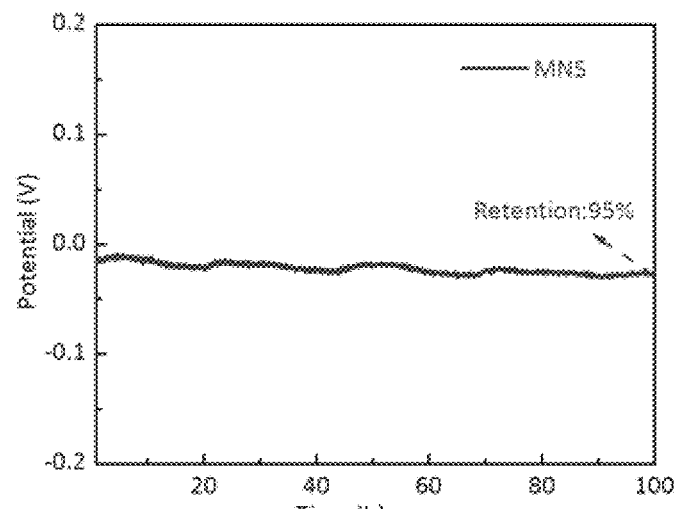
FIG. 3 shows (a) Long term stability for MNS catalyst at the applied current density of −10 mA cm-2 for 100 h without IR correction (b) LSV polarization curve of initial and after 100 h with 85% IR corrected.
Figure 3:
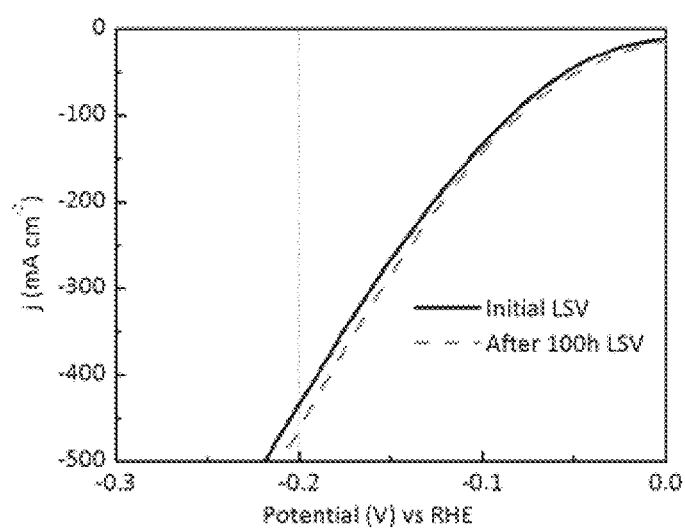

The MNS catalyst of the present invention is tried for oxygen evolution reaction (OER) in same electrolyte solution in 1M KOH. MNS catalysts possess better activity than standard Ru/C. MNS catalyst requires an overpotential of as low as 450mV to reach a current density of 100 mA $cm^{-2}$, whereas the standard Ru/C needs 510 mV to reach the same current density (100 mA $cm^{-2}$) as seen in FIG. 3a. The comparison data of the activity with standard Ru/C is provided in Table-2.

TABLE 1

| Catalyst | Mass loading (mg) | $\eta_{20}$ (mV) @ mA cm$^{-2}$ | $\eta_{100}$ (mV) @ mA cm$^{-2}$ | $J_{200}$ (mA cm$^{-2}$) @ mV | Tafel (mV dec$^{-1}$) | $J_0$ (mA cm$^{-2}$) |
|---|---|---|---|---|---|---|
| NF | — | 127 | 248 | 56 | 102 | 1.14 |
| Pt/C | 9.3 | — | 76 | 363 | 85 | 1.16 |
| NS | 9.5 | 85 | 187 | 120 | 112 | 1.47 |
| MNS | 9.3 | 21 | 85 | 437 | 82 | 2.04 |

TABLE 2

| Catalyst | Mass loading (mg) | $\eta_{50}$ (mV) @ mA cm$^{-2}$ | $\eta_{100}$ (mV) @ mA cm$^{-2}$ |
|---|---|---|---|
| NF | — | 510 | 560 |
| Ru/C | 9.3 | 470 | 510 |
| NS | 9.5 | 420 | 480 |
| MNS | 9.3 | 390 | 450 |

FIG. 1 depicts PXRD pattern of the nickel sulphides (NS), and MNS catalyst of the present invention. 3R-MoS$_2$-Ni$_3$S$_4$-NiS$_2$-NiS nanosheet is fabricated by a one-pot hydrothermal synthesis at 150° C.-250° C. The MNS catalyst of the present invention is characterized by Powder X-Ray Diffraction (PXRD) to understand the crystal structural information of the composites and phases present in the sample. As shown in FIG. 1, the peak at 2θ=14.07° is assigned to 3R-MoS$_2$ corresponding (003) plane.

PXRD pattern is studied to understand the phase composition of MS and NS. In FIG. 1, the as prepared Ni$_x$S$_y$ and 3R-MoS$_2$-Ni$_x$S$_y$ are analysed. In MNS sample, the 2θ value at 14.1576° is corresponding to the 3R-MoS$_2$ (003) plane with the d-spacing of 6.233 Å (JCPDS-01074-0932). In the absence of Mo precursor, (i.e., during the preparation of NS), only NS phases such as Cubic Ni3S4 (JCPDS-00-047-1739), Cubic NiS2 (JCPDS-01-073-0574) are formed. However, with the addition of Mo precursor, (i.e., during the preparation of MNS) 3R-MoS$_2$ is formed along with the formation of Cubic Ni$_3$S$_4$ (JCPDS-00-047-1739), Cubic NiS$_2$ (JCPDS-01-073-0574) and Rhombohedral structure NiS (JCPDS-00-012-0041). It is observed that the unique combination of these phases is exclusively responsible the formation of 3R-MoS$_2$ which is otherwise rare to be formed.

Figure 2:
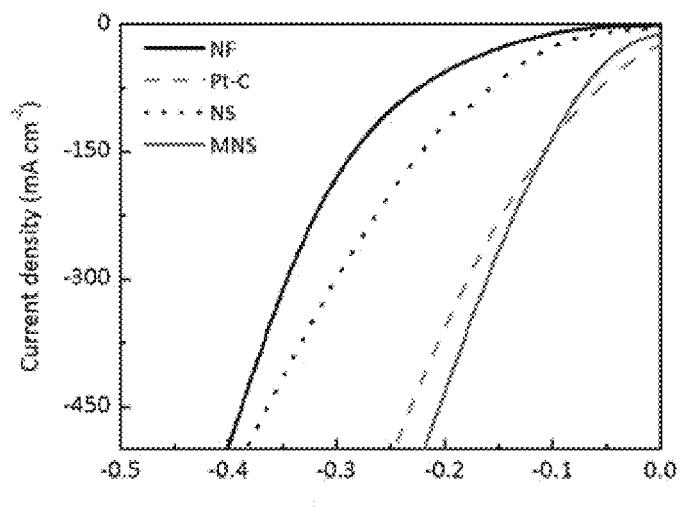
FIG. 2 shows (a) Linear Sweep Voltammetry (LSV) polarization curve (b) corresponding Tafel plots of as prepared catalysts of NS, MNS with blank NF and standard Pt/C. All plots are 85% IR corrected.
Figure 2:
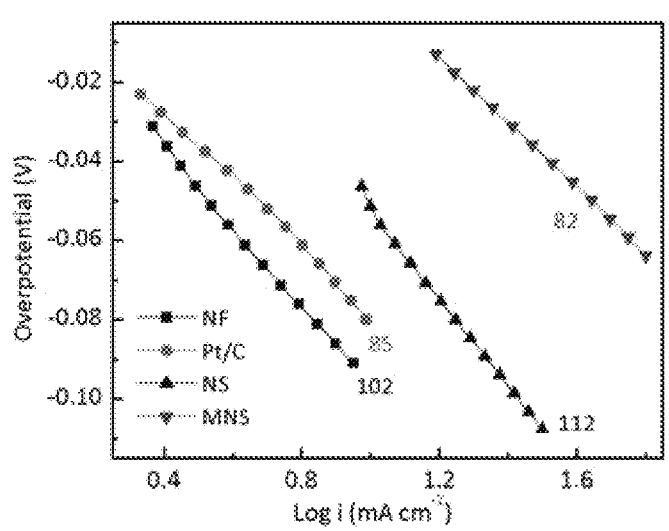

FIG. 2a depicts HER LSV Polarization curve and FIG. 2b shows corresponding Tafel plots for the NS, MNS catalysts along with blank NF and Pt/C catalysts with 85% IR corrected.

The MNS catalyst is tested for long term stability test in 1M KOH for 100 h. It is remarkable to observe a high activity retention of around 95% even after 100 h. (FIG. 3a). Further, an activity gain has been observed after 100 hrs of stability experiment (FIG. 3b) which may be attributed to the possibility that the actives sites that are originally beneath the surface get exposed to reaction due to surface modification during the electrolysis process.

Figure 4:
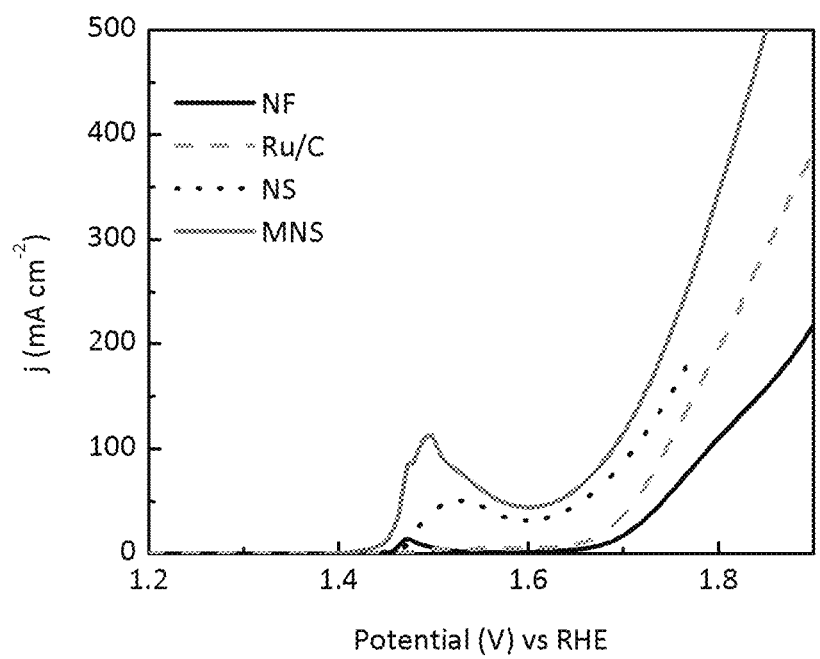
FIG. 4 depicts (a) LSV polarization curve of prepared catalysts of NS, MNS with blank NF and standard Ru/C with 85% IR corrected. All electrochemical studies are carried out by Biologic SAS VSP-300.

FIG. 4 depicts OER LSV polarization curve of the prepared NS and MNS catalysts with blank NF and standard Ru/C catalysts with 85% IR corrected.

Table 3 below summarizes the data of comparison for HER performance of 3R-MoS$_2$-Ni$_3$S$_4$-NiS$_2$-NiS with other reported substrate independent catalyst based on Mo-Ni$_x$S$_y$ (wherein x=1,3 and y=1,2,4).

TABLE 3

| Catalyst | Synthesis | $\eta_x$ (mV)@ mA cm$^{-2}$ | Tafel (mV dec$^{-1}$) | $J_0$ (mA cm$^{-2}$) | Electrolyte |
|---|---|---|---|---|---|
| V doped NiS | Hydrothermal/Calcination | 10@110 | 90 | — | 1M KOH |
| rGo-MoS$_2$ | Hydrothermal | 10@210 | 46 | — | 0.5M H$_2$SO$_4$ |
| NiS$_2$ | Hydrothermal/Calcination | 1@79 | 63 | 1.47 | 1M KOH |
|  |  | 10@174 | 82 |  | 0.5M H$_2$SO$_4$ |
|  |  | 50@ 283 |  |  |  |
|  |  | 1@50 |  |  |  |
|  |  | 10@148 |  |  |  |
|  |  | 50 @ 243 |  |  |  |
| NiS$_2$ | Electrospining/Surfuriation | 10@450 | 83.5 | — | 0.5M H$_2$SO$_4$ |
| N-rGO-Ni$_3$S$_4$—MoS$_2$ | Hydrothermal | 10@94 | 56 | — | 0.5M H$_2$SO$_4$ |
| Mo$_1$—x—NiS$_2$ | Hydrothermal | 10@297 | 94 | 8.5 × 10$^{-3}$ | 0.5M H$_2$SO$_4$ |
| Pt@NiS$_2$—MoS$_2$ | Hydrothermal/CVD | 10@34 | 40 | — | 0.5M H$_2$SO$_4$ |
| 3R—MoS$_2$—Ni$_3$S$_4$—NiS$_2$—NiS | Hydrothermal | 20@21 | 82 | 2.04 | 1M KOH |
|  |  | 100@85 |  |  |  |

Table 4 below summarizes the data of comparison for HER performance of 3R-MoS$_2$-Ni$_3$S$_4$-NiS$_2$-NiS with other reported Phosphide based catalysts.

TABLE 4

| Catalyst | Synthesis | $\eta_x$ (mV)@ mA cm$^{-2}$ | Tafel (mV dec$^{-1}$) | $J_0$ (mA cm$^{-2}$) | Electrolyte |
|---|---|---|---|---|---|
| N—CoP | Hydrothermal/Phosporiatiomn | 10@39 | 58 | — | 1M KOH |
| Mo—CoP | Electrodepostion/Phospodiation | 10@76 | 52 | — | 1M KOH |

TABLE 4-continued

| Catalyst | Synthesis | $\eta_x$ (mV)@ mA cm$^{-2}$ | Tafel (mV dec$^{-1}$) | $J_0$ (mA cm$^{-2}$) | Electrolyte |
| --- | --- | --- | --- | --- | --- |
| MoPS | Electrodeposition | 10@200 | 36 | — | 0.5M H$_2$SO$_4$ |
| iP-CoP | Hydrothermal/ Phosphoriation | 10@76 50@135 | 93 | — | 1M KOH |
| CoFeP | Electrodeposition/ Phosphoriation | 10@58 | 46 | — | 1M KOH |
| Co3S4—CoP | Hydrothermal/ Phosphoriation/ Sulfuriation | Onset@38 10@86 | 45 | — | 0.5M H$_2$SO$_4$ |

Table 5 below summarizes the data of comparison for HER performance of 3R-MoS$_2$-Ni$_3$S$_4$-NiS$_2$-NiS with other reported other polymorphs of MoS$_2$ based catalysts.

TABLE 5

| Catalyst | Synthesis | $\eta_x$ (mV)@ mA cm$^{-2}$ | Tafel (mV dec$^{-1}$) | $J_0$ (mA cm$^{-2}$) | Electrolyte |
| --- | --- | --- | --- | --- | --- |
| NiO@1T—MoS$_2$ | Hydrothermal | Onset@0 10@46 | 52 | 0.44 | 1M KOH |
| 1T' MoS$_2$ | Hydrothermal | 10@170 | 38 | — | 0.5M H$_2$SO$_4$ |
| 1T/2H MoS$_2$ | Hydrothermal | 10@234 | 46 | — | 0.5M H$_2$SO$_4$ |
| 1T/2H MoS$_2$ | Hydrothermal | 10@156 | 47.9 | — | 0.5M H$_2$SO$_4$ |
| 1T—MoS$_2$-G/NF | Solvothermal | 10@117 | 38 | 0.056 | 0.5M H$_2$SO$_4$ |
| 1T/2H MoS$_2$ | Microwave | 10@240 | 43.1 | — | 0.5M H$_2$SO$_4$ |
| 1T/2H MoS$_2$ | Pyrolysis | 10@130 | 77 | 0.014 | 0.5M H$_2$SO$_4$ |

EXAMPLES

Following examples are given by way of illustration and therefore should not be construed to limit the scope of the invention.

Example 1: Synthesis of 3R-MoS$_2$-Ni$_x$S$_y$ (wherein x=1,3 and y=1,2,4) Catalyst Prior to the synthesis procedure, a piece of Ni Foam (NF) 1×3 cm was cleaned with Distilled Water, 3M HCl solution, Distilled water and finally with ethanol for 10 mins each, then vacuum dried at a temperature range between 60° C. and 100° C. for 8-14 h. 10 mm (NH$_4$)$_6$ Mo$_7$O$_{24}$.4H$_2$O (Ammonium molybdate tetrahydrate), 50 mM of Ni (NO$_3$)$_2$.6H$_2$O (Nickel nitrate hexahydrate) and 500 mM of (NH$_4$)$_2$CS (Thio urea) are dissolved in 80 mL milliQ water. The above solution is stirred at constant rotation speed of 500 RPM for complete dissolution of metal precursor in water. After complete dissolution, the above solution was transferred into the 100 mL Teflon lined stainless steel autoclave, the reaction was kept for 4-16 h at the temperature of 150-250° C., after the reaction the temp was reduced to a temperature ranging between 25° C.-35° C. Finally, black color product of 3R-MoS$_2$-Ni$_x$S$_y$ (wherein x=1,3 and y=1,2,4) material was filtered through vacuum suction filtration by milliQ water. The filtration process was continuously followed 3-5 times and used ethanol to remove the unreacted metal precursor during the reaction. After completion of the filtration process, the final product was dried the temperature ranging between 60° C.-100° C. in oven for 8-14 h.

Example 2: Preparation of Electrodes 70-90% of as synthesised catalyst (MNS, NS), 5-25% carbon black and 1-7% PVDF binder were added to the pestle mortar and ground for 3-5 mins clockwise and anti-clockwise in the both directions. Then, 60 μL -100 μL of NMP (N-methyl Pyrrolidone) solvent is added to the above powder and grinding process was followed for again 3-5 mins in both directions. After grinding it was formed as a slurry. After making the slurry, it was loaded on washed 1 cm$^2$ NF (Like a painting). It was coated three times. After each coating, NF was dried by hand drier for 1-2 mins with 15 cm gap between the NF and hand drier. After coating, the loaded NF was dried the temperature ranging between 60° C. -120° C. for 8-14 h.

Example 3: Electrochemical Hydrogen Evolution Reaction

The electrochemical HER and OER performance of the as prepared electrocatalyst is carried out in 1M KOH solution at the scan rate of 2 mV/s is to collect the LSV polarization curve in a three-electrode system. The as prepared catalysts as a working electrode, graphite rod and Saturated Calomel Electrode (SCE) are used as the counter and reference electrode respectively. All the potentials are converted into RHE.

ADVANTAGES OF THE INVENTION

One-pot synthesis
Aqueous medium synthesis
Highly surface-active unique microstructure and morphology
Usage of highly active 3R polymorph of -MoS$_2$ with Ni$_x$S$_y$
Unique composition
Substrate independent catalyst.
Highly active and stable electrocatalysts in alkaline media.
Scalable synthesis method.

We claim:

1. A Hydrogen Evolution Reaction (HER) catalyst comprising a 3R-MoS$_2$-Ni$_x$S$_y$ catalyst; wherein x=1,3 and y=1, 2,4.

2. The HER catalyst as claimed in claim 1, wherein said catalyst shows a stability in alkaline media even after 100 hrs.

3. The HER catalyst as claimed in claim 1, wherein said catalyst needs overpotentials of ($\eta_{20}$) 21 mV and ($\eta_{100}$) 85 mV to reach the current densities of 20 and 100 mA cm$^{-2}$, respectively in 1M KOH at the scan rate of 2 mVs$^{-1}$.

4. The HER catalyst as claimed in claim 1, wherein said catalyst shows an exchange current density of 2.04 mA cm$^{-2}$ at 0V.

5. The HER catalyst as claimed in claim 1, wherein said catalyst requires over potential of ($\eta_{100}$) 450 mV to reach the current density of 100 mA cm$^{-2}$ in OER (oxygen evolution reaction).

6. A method of synthesizing a HER catalyst comprising 3R-MoS$_2$-Ni$_x$S$_y$ catalyst; wherein x=1,3 and y=1,2,4, wherein said catalyst is synthesized by a hydrothermal process comprising the steps of:
  (a) dissolving (NH$_4$)$_6$Mo$_7$O$_{24}$·4H$_2$O (Ammonium molybdate tetrahydrate), Ni (NO$_3$)$_2$·6H$_2$O (Nickel nitrate hexahydrate) and (NH$_4$)$_2$CS (Thiourea) in water; and
  (b) maintaining the reaction mixture at a temperature in the range of 150-250° C. for the period of 8-16 hrs in an autoclave reactor to afford black colored product of 3R-MoS$_2$-Ni$_x$S$_y$ catalyst; wherein x=1,3 and y=1,2,4.

* * * * *